United States Patent
Kulshreshtha et al.

(10) Patent No.: US 12,554,837 B2
(45) Date of Patent: Feb. 17, 2026

(54) APPLICATION SECURITY CONTEXT FROM TRACES AND SNAPSHOTS

(71) Applicant: Cisco Technology, Inc., San Jose, CA (US)

(72) Inventors: Ashutosh Kulshreshtha, Cupertino, CA (US); Walter T. Hulick, Jr., Pearland, TX (US); Oliver Kempe, Santa Clara, CA (US); Aristeidis Prokopios Iliopoulos, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 17/837,290

(22) Filed: Jun. 10, 2022

(65) Prior Publication Data

US 2023/0252133 A1    Aug. 10, 2023

Related U.S. Application Data

(60) Provisional application No. 63/308,697, filed on Feb. 10, 2022.

(51) Int. Cl.
G06F 21/55 (2013.01)
G06F 21/71 (2013.01)

(52) U.S. Cl.
CPC ............ *G06F 21/552* (2013.01); *G06F 21/71* (2013.01)

(58) Field of Classification Search
CPC .......... G06F 21/12; G06F 21/16; G06F 21/54; G06F 21/552; G06F 21/71; G06F 8/433
See application file for complete search history.

(56) References Cited

U.S. PATENT DOCUMENTS

| | | | | |
|---|---|---|---|---|
| 6,377,994 | B1* | 4/2002 | Ault | H04L 63/10 707/999.009 |
| 8,028,200 | B2* | 9/2011 | Ivanov | G06F 11/3466 714/45 |
| 2009/0217259 | A1* | 8/2009 | Winter | G06F 8/71 717/174 |
| 2011/0138363 | A1* | 6/2011 | Schmelter | G06F 11/3636 717/130 |
| 2012/0072887 | A1* | 3/2012 | Basak | G06F 11/323 717/123 |
| 2016/0099951 | A1 | 4/2016 | Kashyap et al. | |
| 2018/0351989 | A1 | 12/2018 | Nazir | |
| 2019/0340103 | A1* | 11/2019 | Nelson | G06F 11/3624 |
| 2020/0021607 | A1 | 1/2020 | Muddu et al. | |
| 2020/0159951 | A1* | 5/2020 | McDonald | G06F 21/54 |
| 2020/0285756 | A1* | 9/2020 | Bhalla | G06F 21/577 |
| 2021/0029156 | A1 | 1/2021 | Sharifi Mehr | |
| 2021/0377217 | A1* | 12/2021 | Antoche Albisor | G06F 21/577 |
| 2022/0006842 | A1 | 1/2022 | Wadhwa et al. | |

* cited by examiner

*Primary Examiner* — Kambiz Zand
(74) *Attorney, Agent, or Firm* — Baker Botts L.L.P.

(57) ABSTRACT

A system and method for securing an application includes determining processing information associated with the application, determining an application dependency map associated with the application at least in part based on the processing information, and determining a security context associated with the application based on the application dependency map.

19 Claims, 2 Drawing Sheets

APPLICATION SECURITY CONTEXT FROM TRACES AND SNAPSHOTS

RELATED APPLICATIONS

This application claims the benefit under 35 U.S.C. § 119(e) of U.S. Provisional Patent Application No. 63/308,697, filed 10 Feb. 2022, which is incorporated herein by reference in its entirety.

TECHNICAL FIELD

Certain embodiments relate, in general, to application security. More specifically, certain embodiments relate to an application security context from traces and snapshots.

BACKGROUND

In general, application security may provide security for a software application. For example, application security may involve finding, fixing, and/or preventing security vulnerabilities that may otherwise leave an application open to exploitation. Application security may be provided at any suitable point in a life cycle of the application, such as at requirements analysis, design, implementation, verification, and/or maintenance. Networks may contain many applications and each application may contain several security vulnerabilities.

DESCRIPTION OF EXAMPLE EMBODIMENTS

Overview

Figure 1:
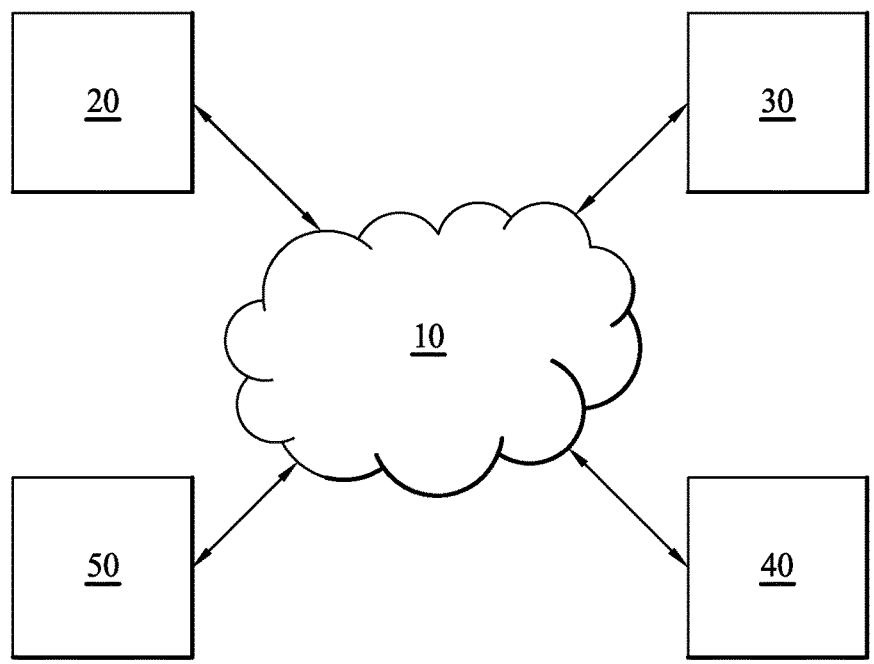
FIG. 1 illustrates a computer network in accordance with certain embodiments.

According to one or more embodiments, a computing system comprises one or more processors and one or more computer-readable non-transitory storage media comprising instructions that, when executed by the one or more processors, cause one or more components of the computing system to perform operations. The operations comprise determining processing information associated with an application, determining an application dependency map associated with the application based at least in part on the processing information, and determining a security context associated with the application based at least in part on the application dependency map.

According to one or more embodiments, a method performed by a computing system comprises determining processing information associated with an application, determining an application dependency map associated with the application based at least in part on the processing information, and determining a security context associated with the application based at least in part on the application dependency map.

According to yet another embodiment, one or more computer-readable non-transitory storage media may embody instructions that, when executed by a processor of a computing system, cause the performance of operations. The operations comprise determining processing information associated with an application, determining an application dependency map associated with the application based at least in part on the processing information, and determining a security context associated with the application based at least in part on the application dependency map.

Technical advantages of certain embodiments of this disclosure may include one or more of the following. For example, monitoring security at the application level is important to providing a full security solution. Certain embodiments derive an application dependency map to build a security context. Certain embodiments allow for using the security context to assign access control or other suitable security controls in various tiers of an application. For example, a security operator may assign access control or other suitable security controls based on the security context. Certain embodiments may allow for improving security at the application level, for example, in order to protect against attacks, slowdowns, or other security vulnerabilities. Certain embodiments may facilitate maximizing speed and uptime while balancing risk through prevention, detection, and/or remediation of security vulnerabilities. In certain embodiments, the security context may be used to determine a severity of a security vulnerability and to tailor the security controls or other remediation accordingly. For example, security controls and/or other remediation may be tied to business impact.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Providing security for applications at the application level is becoming increasingly important in the security space. Certain embodiments of the present disclosure improve application security by providing techniques for appropriately determining threats and building the security context at the application level.

Runtime Application Self-Protection (RASP) provides a general technique for in-application security. RASP is an application security technology that facilitates identifying and isolating threats. As an example, RASP may run on a server or other computing system to identify and isolate threats associated with applications of the server or other computing system. As a "runtime" security technology, RASP may run in real-time and may keep running with the application. For example, RASP may be configured to run at all times (e.g., 24 hours per day and 7 days per week). RASP security technology may be linked to or built into an application's environment (e.g., rather than being deployed at the end of application development) in order to make the technology more effective at preventing threats and attacks.

RASP may use application context and behavior to gather data on whether an application is performing normally. Because RASP may be based on the server where an application lives, RASP can detect and block attacks immediately. For example, unlike more traditional application security tools, RASP may use an application's data and logic to detect, block, and report attacks. By building RASP into an application, abnormal behavior in the application can be detected and then automatically isolated. This facilitates tailoring the security technology to the security needs of each application. Certain examples of RASP technology have the ability to alert, protect, and resolve security events depending on the severity of the security events. RASP may be configured to generate an alert immediately in response to recognizing certain security events, such as security breaches.

Certain embodiments of the present disclosure may improve RASP or other application security technology. For example, certain embodiments may facilitate providing improved visibility into contextual data on the application's behavior when a threat is detected. The contextual data may indicate a source of an attack (who is attacking), where a vulnerability lies, and/or which application(s) have been targeted. Certain embodiments run in real-time to provide continual protection (e.g., without requiring an administrator to manually operate a security tool). Certain embodiments improve accuracy in order to efficiently identify and defend against attacks. Certain embodiments include intelligence that can distinguish between an attack and other actions (such as information requests) in order to reduce the amount of false positives. Certain embodiments facilitate detecting zero-day security attacks that occur the same day that an exploit becomes known. For example, application security may be provided in real-time to detect and block these kinds of zero-day security attacks swiftly. Certain embodiments may facilitate automatically blocking threats in real-time to safeguard data of an organization (and its customers), thereby safeguarding the reputation of the organization. Certain embodiments simplify the life cycle of vulnerability fixes and see what is happening inside the code to prevent known exploits.

Certain embodiments of the present disclosure derive an application dependency map to build a security context. The security context may be used to allow security operators to assign access control and suitable security controls in various tiers of the application. To build the application dependency map, one or more traces may be applied to the application, and the application may be correlated across various applications. A trace may include inserting a unique trace identifier into a request to an application and tracking the unique trace identifier at all steps of the request. Correlating the request allows for multiples traces to be observed, and from the observations, an application dependency map (or application dependency map) may be derived. A typical stack for a web based application may include a webserver, a backend application, a database, authentication servers, etc. There are various tools available (such as tools provided by AppDynamics) that provide application monitoring by tracking transactions (e.g., tracking the flow of information) through a service and determining the latency that each application adds to the transaction. The traces and the derived application dependency map may be used to build the security context. This security context would allow security operators to assign access control and suitable security controls in various tiers of the application. For example, if the security context indicates that attackers would attack from the Internet, then it may be determined that an Internet-related application (such as a webserver application) would be a more critical application to secure.

Certain embodiments may use machine learning to determine the security context for an application based on one or more traces. Some examples of learned security context include: a service (e.g., a webserver) exposed to the Internet, or a service that is N number of hops away from the Internet, where the value of N may be any suitable number (e.g., 1, 2, or 3, etc.); a service (e.g., a webserver) located on a server hosting sensitive data (i.e., a database server) (e.g., in certain embodiments, the learned security context may indicate a webserver running on the same machine as the database based on the IP addresses learned in the transaction); services secured by a Web Application Firewall ("WAF"); a distance a service is from risky sources, such as the distance from the Internet, the distance from a computer (such as an employee laptop) with vulnerable software running or without vulnerable software running, the distance from a computer (such as an employee laptop) that is or is not up-to-date (e.g., based on whether the computer is running a latest version of software), the distance from an Internet-of-Things (IoT) device, because in certain embodiments, an IoT device may tend to be less secure than other devices.

Application security is one of the fastest growing segments of cybersecurity. Information security personnel require vulnerability assessment of applications like webservers because it is required for compliance with security standards. In a typical large organization, information security personnel deal with hundreds of applications and modules. Significant investment is often required for the application owners to explain the security context of various modules. Certain embodiments of the present disclosure leverage the fact that most application owners already use application performance monitoring tools, thus, certain embodiments may derive security context directly from performance monitoring. This facilitates reducing friction between customers (e.g., information security personnel) and application owners.

Certain embodiments detect application code dependency and configuration-level security vulnerabilities. Certain embodiments detect such dependencies or vulnerabilities in production with automatic runtime protection. Certain embodiments continuously monitor vulnerabilities to find and block exploits automatically, maximizing speed and uptime while minimizing risk. Certain embodiments allow for prioritizing a response based on business impact.

Various embodiments may be used for various types of applications, such as cloud native applications, multi-cloud environments, container-based applications, container orchestration applications, mainframe applications, data center applications, microservices applications, and/or other types of applications.

FIG. 1 illustrates a computer network 10 in accordance with certain embodiments. The computer network 10 may include one or more databases 20, one or more application backends 30, one or more webservers 40, and one or more user devices 50. The one or more databases 20, one or more application backends 30, one or more webservers 40, and one or more user devices 50 may be communicatively coupled either directly or indirectly to each other over the computer network 10. Data may be communicated over the network between one or more of the one or more databases 20, the one or more application backends 30, the one or more webservers 40, and the one or more user devices 50.

The network 10 may be a wired or wireless network such as the Internet, an intranet, a LAN, a WAN, a cellular network or another type of network. It will be understood that network 10 may be a combination of multiple different kinds of wired or wireless networks. Due to the communication of data over the network, each of the one or more databases 20, the one or more application backends 30, the one or more webservers 40, and the one or more user devices 50 may experience vulnerabilities.

Figure 2:
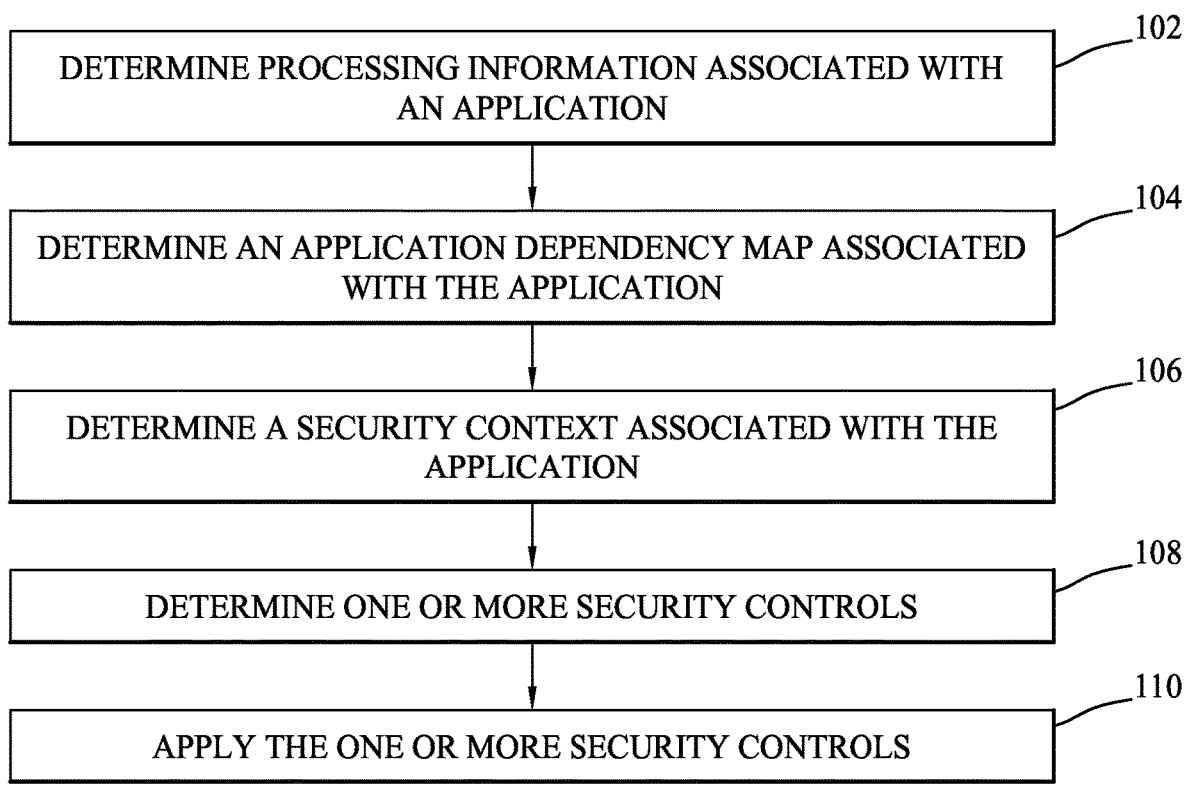
FIG. 2 is a flow chart illustrating a method in accordance with certain embodiments.

Referring now to FIG. 2, a method in accordance with certain embodiments is illustrated. The method may be performed by a computing system, such as computing system 200 described with respect to FIG. 3.

The method begins at step 102 with determining processing information associated with an application. Processing information may include any information which may define interrelationships among the systems and applications in a network. In one or more embodiments, determining processing information associated with the application may include applying a first trace in an application and/or capturing a snapshot of the application. In certain embodiments, applying a first trace may include inserting a first unique trace identifier into a first request, issuing the first request to the application, and tracking the first request by monitoring the first unique trace identifier. Further, in certain embodiments, tracking the first request by monitoring the first unique trace identifier may include tracking the flow of information through the application as a result of the issued first request. Additionally, in one or more embodiments, a snapshot may include a report of all processes occurring in the application at a given time. In certain embodiments, one or more agents within the application may track the first trace and/or record the processes occurring in the application to build the snapshot.

The method proceeds to step 104 with determining an application dependency map associated with the application. The application dependency map is determined based at least in part on the processing information (e.g., the first trace applied and/or the snapshot captured) determined in step 102. Certain embodiments determine the application dependency map based on a plurality of traces (e.g., the first trace and one or more other traces) and/or a plurality of snapshots. As an example, certain embodiments apply a second trace to the application (e.g., in a manner similar to that described for the first trace in step 102), certain embodiments apply a third trace to the application, and so on. In certain embodiments, applying the second trace and/or the third trace may include inserting a second unique trace identifier and/or a third unique trace identifier into a second request and/or a third request, issuing the second request and/or the third request to the application, and tracking the second request and/or the third request by monitoring the second unique trace identifier and/or the third unique trace identifier. In certain embodiments, a request may be correlated across various applications, which allows for multiples traces to be observed, and from the observations, the application dependency map can be derived. Similarly, in one or more embodiments, the application dependency map may be determined based on a plurality of snapshots. As an example, certain embodiments capture a second snapshot, certain embodiments capture a third snapshot, and so on. Further, in one or more embodiments, the application dependency map may be determined based on a plurality of traces and a plurality of snapshots. In certain embodiment, the application dependency map may indicate one or more dependencies of the application.

The method proceeds to step 106 with determining a security context associated with the application. The security context is determined based at least in part on the application dependency map determined in step 104. As an example, in certain embodiments, the security context indicates whether a service associated with the application is exposed to a security risk, a distance of the service from a source of the security risk, whether the service is hosted on hardware that hosts sensitive data, and/or whether the service is secured by a firewall. Further, in certain embodiments, determining a security context associated with the application may include determining one or more vulnerabilities of the application. Furthermore, in certain embodiments, determining the one or more vulnerabilities of the application may include determining a relative rank for each of the one or more vulnerabilities of the application. By way of example only, in one or more embodiments, the relative rank for each of the one or more vulnerabilities of the application may be determined using a common vulnerability scoring system such as Common Vulnerability Scoring system Version 3.0 (also known as CVSS v3.0).

The method proceeds to step 108 with determining one or more security controls. The one or more security controls are based on the security context determined in step 106. For example, if the security context indicates that attackers would attack from the Internet, then it may be determined that an Internet-related application (such as a webserver application) would be a more critical application to secure. Certain embodiments communicate the security context to an operator, which allows for determining the one or more security controls in step 108 based on the operator's response to the security context. Certain embodiments may determine the one or more security controls in step 108 automatically, for example, by applying one or more rules to the security context. The one or more rules may be configured by the operator, determined by machine learning, and/or obtained in any other suitable manner.

The method proceeds to step 110 with applying the one or more security controls of step 108 to the application. Certain embodiments allow for using the security context to assign access control or other suitable security controls in various tiers of an application. Further, while in one or more embodiments, the one or more security controls may be applied to the application by an operator, in other embodiments, the one or more security controls may be applied automatically.

In certain embodiments, the method may further include applying traces in the application and/or capturing snapshots of the application in addition to the first trace and/or the first snapshot, and updating the application dependency map associated with the application based at least in part on the additionally applied traces and/or the additionally captured snapshots. As application architecture changes over time, the continuous application of traces to the application and or captures of snapshots will allow for these changes to be captured within the updated application dependency map. In certain embodiments, the updated application dependency map may then be used to carry out steps 106, 108, and 110 of the method as described above. For example, in certain embodiments, the method may further include determining an updated security context associated with the application based on the updated application dependency map, determining one or more security controls based on the updated security context, and applying the one or more security controls based on the updated security context.

Figure 3:
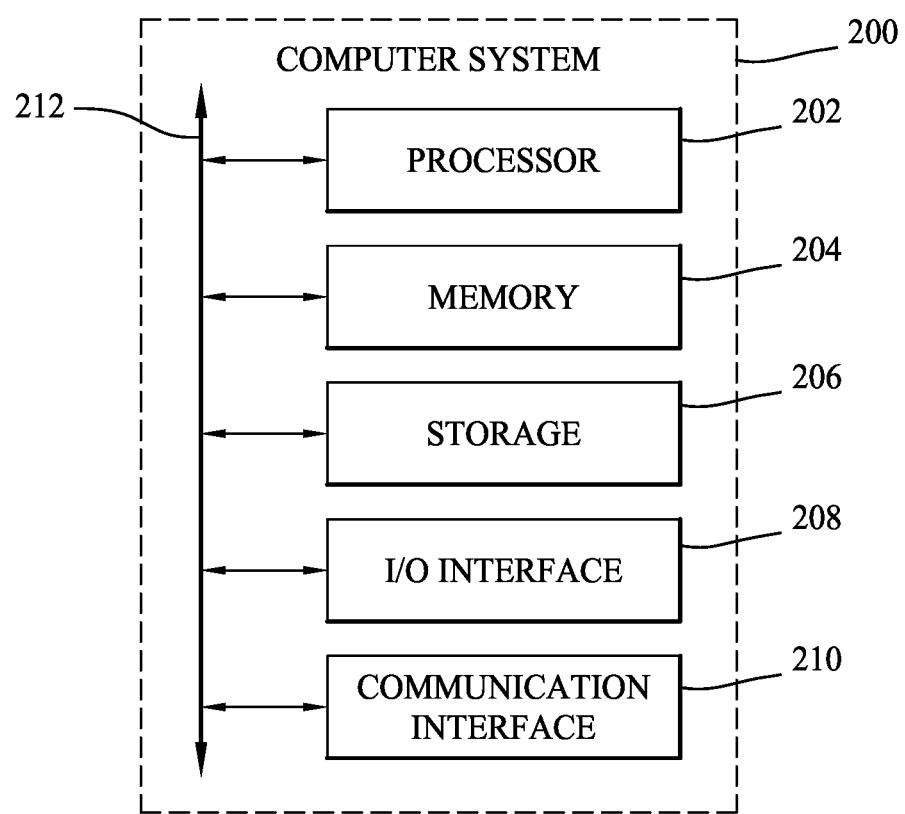
FIG. 3 illustrates a computer system in accordance with certain embodiments.

Reference is now made to FIG. 3, which shows a computer system 200 which may be used by the systems and methods described herein. In particular embodiments, one or more computer systems 200 provide functionality described or illustrated herein. As an example, one or more computer systems 200 may be used to perform one or more steps described with respect to FIG. 2. In particular embodiments, software running on one or more computer systems 200 provides functionality described or illustrated herein or performs one or more steps of one or more methods described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server (e.g., a webserver, an authentication server, a data center server, etc.), a backend appliance, a database device, a tablet computer system, an augmented/virtual reality device, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example, and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A computer-implemented method securing an application, comprising:
   determining processing information associated with the application, wherein the processing information comprises information associated with a plurality of traces in the application and a plurality of snapshots of the application;
   deriving an application dependency map associated with the application at least in part based on the processing information associated with the plurality of traces and the plurality of snapshots of the application, wherein the processing information defines interrelationships among systems and applications in a network;
   determining a security context associated with the application based on the application dependency map;
   updating the application dependency map associated with the application based on the plurality of traces and one or more of the plurality of snapshots;
   determining an updated security context associated with the application based on the updated application dependency map;
   determining one or more security controls based on the updated security context; and
   applying the one or more security controls based on the updated security context.

2. The method of claim 1, wherein determining the processing information comprises:
   applying a first trace in the application; and
   capturing a first snapshot of the application.

3. The method of claim 2, wherein applying the first trace in the application comprises:
   inserting a first unique trace identifier into a first request;
   issuing the first request to the application; and
   tracking the first request by monitoring the first unique trace identifier.

4. The method of claim 2, wherein determining the processing information further comprises:
   applying a second trace in the application; and
   capturing a second snapshot of the application, and the application dependency map associated with the application is determined based on at least one of a combination of the first trace and the second trace and a combination of the first snapshot and the second snapshot.

5. The method of claim 4, wherein applying the second trace in the application comprises:
   inserting a second unique trace identifier into a second request;
   issuing the second request to the application; and
   tracking the second request by monitoring the second unique trace identifier.

6. The method of claim 1, wherein determining the processing information comprises:
   applying the plurality of traces in the application; and
   capturing the plurality of snapshots of the application.

7. The method of claim 1, wherein determining the security context associated with the application comprises:
   determining one or more vulnerabilities of the application.

8. The method of claim 7, wherein determining the one or more vulnerabilities of the application comprises:
   determining a relative rank for each of the one or more vulnerabilities of the application.

9. The method of claim 1, further comprising:
   determining one or more security controls based on the security context; and
   applying the one or more security controls to the application.

10. The method of claim 9, wherein determining one or more security controls based on the security context and applying the one or more security controls to the application are performed automatically.

11. The method of claim 1, wherein the security context is configured to indicate one or more of whether a service associated with the application is exposed to a security risk, a distance of the service from a source of the security risk, whether the service is hosted on hardware that hosts sensitive data, and whether the service is secured by a firewall.

12. A system, comprising:
   one or more processors; and
   one or more computer-readable non-transitory storage media comprising instructions that, when executed by the one or more processors, cause one or more components of the system to perform operations comprising:
      determining processing information associated with an application, wherein the processing information comprises information associated with a plurality of traces in the application and a plurality of snapshots of the application;
      deriving an application dependency map associated with the application based at least in part on the processing information, wherein the processing information defines interrelationships among systems and applications in a network;
      determining a security context associated with the application based on the application dependency map;

updating the application dependency map associated with the application based on the plurality of traces and one or more of the plurality of snapshots;

determining an updated security context associated with the application based on the updated application dependency map;

determining one or more security controls based on the updated security context; and applying the one or more security controls based on the updated security context.

13. The system of claim 12, wherein determining processing information comprises:

applying a first trace in the application; and capturing a first snapshot of the application.

14. The system of claim 13, wherein applying the first trace in the application comprises:

inserting a first unique trace identifier into a first request;

issuing the first request to the application; and tracking the first request by monitoring the first unique trace identifier.

15. The system of claim 12, wherein determining processing information comprises:

applying the plurality of traces in the application; and capturing the plurality of snapshots of the application.

16. The system of claim 12, wherein determining the security context associated with the application comprises:

determining one or more vulnerabilities of the application.

17. The system of claim 16, wherein determining the one or more vulnerabilities of the application comprises:

determining a relative rank for each of the one or more vulnerabilities of the application.

18. The system of claim 12, the operations further comprising:

determining one or more security controls based on the security context; and applying the one or more security controls to the application.

19. The system of claim 18, wherein determining one or more security controls based on the security context and applying the one or more security controls to the application are performed automatically.

* * * * *